US009798980B2

(12) United States Patent
Sabah et al.

(10) Patent No.: US 9,798,980 B2
(45) Date of Patent: Oct. 24, 2017

(54) METHOD FOR INFERRING LATENT USER INTERESTS BASED ON IMAGE METADATA

(71) Applicant: InSnap, Inc., Santa Clara, CA (US)

(72) Inventors: Mohammad Sabah, San Jose, CA (US); Mohammad Iman Sadreddin, Santa Clara, CA (US); Shafaq Abdullah, Belmont, CA (US)

(73) Assignee: THE HONEST COMPANY, INC., Santa Monica, CA (US)

( * ) Notice: Subject to any disclaimer, the term of this patent is extended or adjusted under 35 U.S.C. 154(b) by 392 days.

(21) Appl. No.: 14/627,064

(22) Filed: Feb. 20, 2015

(65) Prior Publication Data

US 2016/0180235 A1    Jun. 23, 2016

Related U.S. Application Data

(60) Provisional application No. 62/093,372, filed on Dec. 17, 2014.

(51) Int. Cl.
| | |
|---|---|
| *G06F 9/44* | (2006.01) |
| *G06N 7/02* | (2006.01) |
| *G06N 7/06* | (2006.01) |
| *G06N 5/04* | (2006.01) |
| *G06F 17/30* | (2006.01) |

(Continued)

(52) U.S. Cl.
CPC ....... *G06N 5/048* (2013.01); *G06F 17/30038* (2013.01); *G06F 17/3053* (2013.01); *G06F 17/30377* (2013.01); *G06F 17/30598* (2013.01); *G06F 17/30958* (2013.01); *G06N 5/02* (2013.01); *G06Q 30/0269* (2013.01)

(58) Field of Classification Search
USPC ........................................... 706/52
See application file for complete search history.

(56) References Cited

U.S. PATENT DOCUMENTS 7,340,458 B2 * 3/2008 Vaithilingam .... G06F 17/30038
7,548,929 B2 * 6/2009 Collins ............ G06F 17/30731
(Continued)

OTHER PUBLICATIONS

Knowledge-assisted semantic video object detection S. Dasiopoulou; V. Mezaris; I. Kompatsiaris; V. -K. Papastathis; M. G. Strintzis IEEE Transactions on Circuits and Systems for Video Technology Year: 2005, vol. 15, Issue: 10 pp. 1210-1224, DOI: 10.1109/TCSVT.2005.854238 IEEE Journals & Magazines.*

(Continued)

*Primary Examiner* — Michael B Holmes
(74) *Attorney, Agent, or Firm* — Patterson + Sheridan, LLP

(57) ABSTRACT

Techniques disclosed herein describe inferring user interests based on metadata of a plurality of multimedia objects captured by a plurality of users. An analysis tool receives, for each of the users, metadata describing each multimedia object in the plurality of objects associated with that user. Each multimedia object includes one or more attributes imputed to that object based on the metadata. The analysis tool identifies one or more concepts from the one or more attributes. Each concept includes at least a first attribute that co-occurs with a second attribute imputed to a first multimedia object. The analysis tool associates a first one of the plurality of users with at least one of the concepts based on the attributes imputed to multimedia objects associated with the first one of the plurality of users.

23 Claims, 8 Drawing Sheets

(51) Int. Cl.
*G06N 5/02* (2006.01)
*G06Q 30/02* (2012.01)

(56) References Cited

U.S. PATENT DOCUMENTS

| | | | | | |
|---|---|---|---|---|---|
| 8,055,708 | B2* | 11/2011 | Chitsaz | ............... | H04L 63/0245 |
| | | | | | 709/204 |
| 8,869,235 | B2* | 10/2014 | Qureshi | ................ | H04L 63/20 |
| | | | | | 713/150 |
| 9,137,262 | B2* | 9/2015 | Qureshi | ................ | H04L 63/20 |
| 9,143,529 | B2* | 9/2015 | Qureshi | ................ | H04L 63/20 |
| 9,143,530 | B2* | 9/2015 | Qureshi | ................ | H04L 63/20 |
| 9,183,380 | B2* | 11/2015 | Qureshi | ................ | G06F 21/53 |
| 9,454,530 | B2* | 9/2016 | Sabah | ............... | G06F 17/30029 |
| 9,501,466 | B1* | 11/2016 | Namjoshi | ........... | G06F 17/2705 |
| 9,529,996 | B2* | 12/2016 | Qureshi | ................ | G06F 21/53 |
| 2016/0180235 | A1* | 6/2016 | Sabah | ................ | G06F 17/3053 |
| | | | | | 706/52 |
| 2016/0180402 | A1* | 6/2016 | Sabah | ................ | G06F 17/3053 |
| | | | | | 705/14.66 |
| 2016/0203137 | A1* | 7/2016 | Sabah | ................ | G06F 17/3053 |
| | | | | | 707/738 |
| 2016/0203141 | A1* | 7/2016 | Sabah | ................ | G06F 17/3053 |
| | | | | | 707/739 |

OTHER PUBLICATIONS

Naming service in the distributed object environment for adlets (ADDNS) H. I. Ghariv; Ping-Wen Chen; Shi-Kuo Chang 1999 Proceedings. Fourth International Workshop on Object-Oriented Real-Time Dependable Systems Year: 1999 pp. 76-90, DOI: 10.1109/WORDS.1999.806564 IEEE Conference Publications.*

Joint Latent Dirichlet Allocation for Social Tags Jiangchao Yao; Yanfeng Wang; Ya Zhang; Jun Sun; Jun Zhou IEEE Transactions on Multimedia Year: 2017, vol. PP, Issue: 99 pp. 1-1, DOI: 10.1109/TMM.2017.2716829 IEEE Early Access Articles.*

Multi-source user profiling and keyword inference for personalized application enablement Armen Aghasaryan; Stéphane Betgé-Brezetz; Muralidharan Kodialam; Sarit Mukherjee; Christophe Senot; Yann Toms; Limin Wang 2009 13th International Conference on Intelligence in Next Generation Networks pp. 1-5, DOI: 10.1109/ICIN.2009.5357091 IEEE.*

* cited by examiner

METHOD FOR INFERRING LATENT USER INTERESTS BASED ON IMAGE METADATA

CROSS-REFERENCE TO RELATED APPLICATIONS

This application claims priority to U.S. Provisional Application No. 62/093,372, filed Dec. 17, 2014. The content of the aforementioned application is incorporated by reference in its entirety.

BACKGROUND

Field

Embodiments of the present disclosure generally relate to data analytics. More specifically, embodiments presented herein relate to generating a learning model of user interests based on image or video metadata.

Description of the Related Art

Individuals take images to capture personal experiences and events. The images can represent mementos of various times and places experienced in an individual's life.

In addition, mobile devices (e.g., smart phones, tablets, etc.) allow individuals to easily capture both digital images as well as record video. For instance, cameras in mobile devices have steadily improved in quality and are can capture high-resolution images. Further, mobile devices now commonly have a storage capacity that can store thousands of images. And because individuals carry smart phones around with them, they can capture images and videos virtually anywhere.

This has resulted in an explosion of multimedia content, as virtually anyone can capture and share digital images and videos via text message, image services, social media, video services, and the like. This volume of digital multimedia, now readily available, provides a variety of information.

SUMMARY

One embodiment presented herein describes a method for inferring user interests based on metadata of a plurality of multimedia objects captured by a plurality of users. The method generally includes receiving, for each of the users, metadata describing each multimedia object in the plurality of objects associated with that user. Each multimedia object includes one or more attributes imputed to that object based on the metadata. The method also includes identifying one or more concepts from the one or more attributes. Each concept includes at least a first attribute that co-occurs with a second attribute imputed to a first multimedia object. The method also includes associating a first one of the plurality of users with at least one of the concepts based on the attributes imputed to multimedia objects associated with the first one of the plurality of users.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
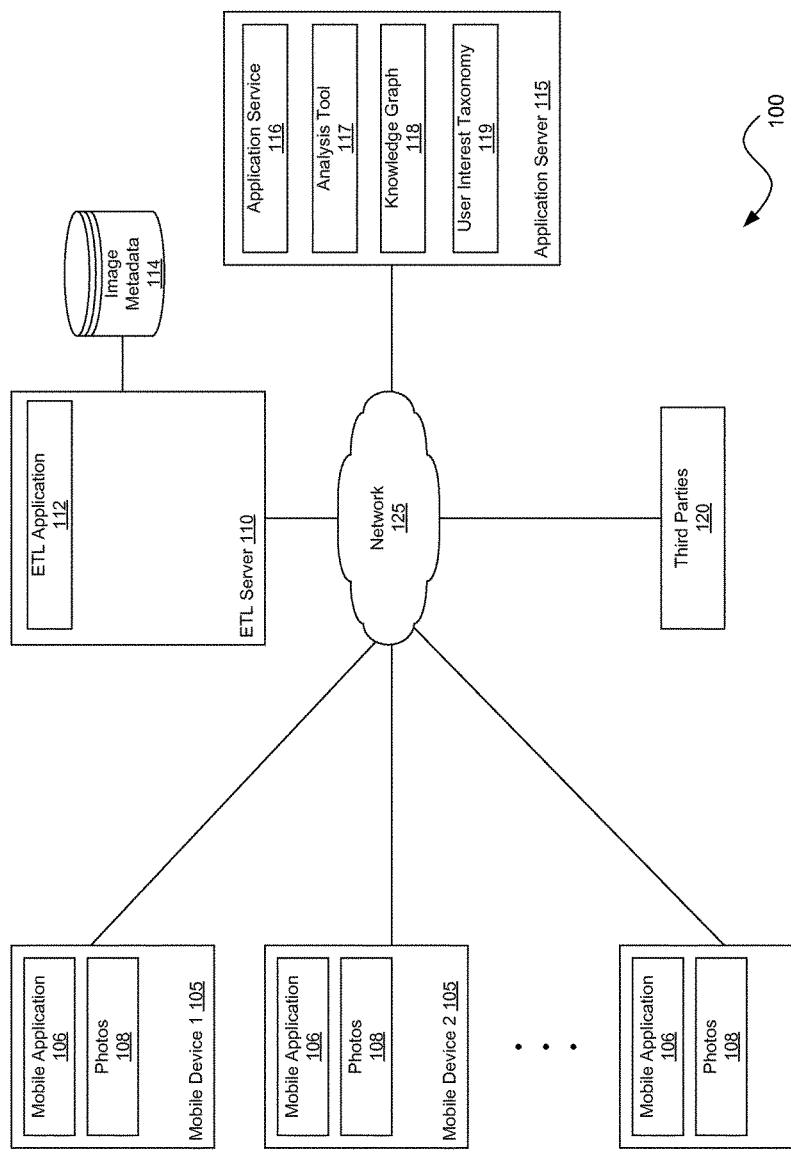
FIG. 1 illustrates an example computing environment, according to one embodiment.

Embodiments presented herein describe techniques for inferring user interests from metadata associated with digital multimedia (e.g., images and video). Digital multimedia provides a wealth of information which can be evaluated to determine a variety of valuable insights about individuals taking images. For example, assume an individual takes pictures at a golf course using a mobile device (e.g., a smart phone, tablet, etc.). Further, assume that the pictures are the only indication the individual was at the golf course (e.g., because the individual made only cash purchases and signed no registers). Metadata associated with this image can place the individual at the golf course at a specific time. Further, event data could be used to correlate whether there was going on at that time (e.g., a specific tournament). Such information may be useful to third parties, e.g., for targeted advertising and recommendations.

However, an advertiser might not be able to identify an effective audience for targeting a given product or service based on such information alone. Even if image metadata places an individual at a golf course at a particular point of time, the advertiser might draw inaccurate inferences about the individual. For example, the advertiser might assume that because the metadata places the individual at a high-end golf course, the individual is interested in high-end golf equipment. The advertiser might then recommend other high-end equipment or other golf courses to that individual. If the individual rarely plays golf or does not usually spend money at high-end locations. Such recommendations may lead to low conversion rates for the advertiser. Historically, advertisers have been generally forced to accept low conversation rates, as techniques for identifying individuals likely to be receptive to or interested in a given product or service are often ineffective.

Embodiments presented herein describe techniques for inferring user interests based on metadata of images (e.g., digital photos). Specifically, embodiments describe building a predictive model used to infer interests for a user. In one embodiment, a multimedia service platform provides a software development kit (SDK) that third parties (e.g., retailers, marketers, etc.) may use to build mobile applications that extracts metadata from digital multimedia captured and stored on a mobile device. The metadata may describe where and when a given image was taken. The mobile application can use APIs included in the SDK to upload images and videos and metadata thereof to the platform from a mobile device. Further, the multimedia service platform may identify patterns from metadata extracted from images and videos. Further, embodiments presented herein can identify latent relationships between different categories, topics, or subjects (referred to generally as interests or user interests) from multimedia collections of multiple users. For example, if many users take pictures at golf courses also take pictures at an unrelated event (e.g., at a traveling museum exhibit) then the system can discover a relationship between these otherwise unrelated interests. Thereafter, advertising related to golfing products and services could be targeted to individuals who publish pictures of the travelling museum exhibit, regardless of any other known interest in golf.

In one embodiment, the multimedia service platform evaluates metadata corresponding to each image or video submitted to the platform against a knowledge graph. The knowledge graph provides a variety of information about events, places, dates, times, etc. that may be compared with the metadata of a given image. For example, the knowledge graph may include weather data, location data, event data, and online encyclopedia data. For instance, attributes associated with an event may include a name, location, start time, end time, price range, etc. The multimedia service platform correlates spatiotemporal metadata from a digital image with a specific event in the knowledge graph. That is, the knowledge graph is used to impute attributes related to events, places, dates, times, etc., to a given digital multimedia file based on the metadata provided with that file.

In one embodiment, the analysis tool represents attributes imputed to digital multimedia in a user-attribute matrix, where each row of the matrix represents a distinct user and each column represents an attribute from the knowledge graph that can be imputed to a digital multimedia file. The analysis tool may add columns to the user-attribute matrix as additional attributes are identified. The cells of a given row indicate how many times a given attribute has been imputed to a digital multimedia file published by a user corresponding to that row. Accordingly, when the analysis tool imputes an attribute to a digital multimedia file (based on the file metadata), a value for that attribute is incremented in the user-attribute matrix. Doing so allows the multimedia service platform to identify useful information about that user. For instance, the analysis tool may identify that a user often attends sporting events, movies, participates in a particular recreational event (e.g., skiing or golf), etc. In addition, the analysis tool may identify information about events that the user attends, such as whether the events are related to a given sports team, whether the events are related to flights from an airport, a range specifying how much the event may cost, etc.

In one embodiment, the multimedia service platform learns concepts based on co-occurring attributes identified in the user-attribute matrix. A concept is a collection of one or more identified attributes. The multimedia service platform may use machine learning techniques to learn concepts from the attributes of the user-attribute matrix. For example, machine learning techniques cluster or otherwise group group attributes based on co-occurrences. For instance, "travel," "winter," "Park City," and "skiing" may frequently co-occur. As a result, the machine learning techniques may group these co-occurring attributes into a concept (e.g., a "skiing" concept). Further, the multimedia service platform may score an attribute to each respective concept. The multimedia service platform may associate attributes that satisfy specified criteria (e.g., the top five scores per concept, attributes exceeding a specified threshold, etc.) to a given concept.

Further, the analysis tool may generate an interest taxonomy based on the learned concepts. In one embodiment, an interest taxonomy is a hierarchical representation of user interests. For example, the interest taxonomy can identify general groups (e.g., sports, music, and travel) and subgroups (e.g., basketball, rock music, and discount airlines) of interest identified from the concepts. The multimedia service platform may use the interest taxonomy to discover latent relationships between concepts. For example, the multimedia service platform may build a predictive learning model using the interest taxonomy.

In one embodiment, the multimedia service platform may use the interest taxonomy to infer interests of a given user. To do so, the multimedia service platform builds a learning model that determines membership scores of a user for a given concept. By training the learning model, the multimedia service platform can identify latent interests of the user based on the interest taxonomy of the user as a result. Further, the multimedia service platform may map product feeds of third parties to user interest taxonomies to identify products to recommend to a given user. Doing so allows third parties to target more meaningful recommendations to a given user.

Note, the following description relies on digital images captured by a user and metadata as a reference example of learning latent interests based on the metadata. However, one of skill in the art will recognize that the embodiments presented herein may be adapted to other digital multimedia that include time and location metadata, such as digital videos captured on a mobile device. Further, an analysis tool may extract metadata particular to a type of the multimedia, e.g., the length of a video, which can be used relative to the techniques described herein.

FIG. 1 illustrates an example computing environment 100, according to one embodiment. As shown, the computing environment 100 includes mobile devices 105, an extract, transform, and load (ETL) server 110, an application server 115, and a third party system 120, connected to a network 125 (e.g., the Internet).

In one embodiment, the mobile devices 105 include a mobile application 106 which allows users to interact with a multimedia service platform (represented by the ETL server 110 and the application server 115). In one embodiment, the mobile application 106 is developed by a third-party enterprise (e.g., a retailer, social network provider, fitness tracker developer, etc.). The mobile application 106 may send images 108 and associated metadata to the multimedia service platform. In one embodiment, the mobile application 106 may access APIs exposed by a software development kit (SDK) distinct to the platform.

In another embodiment, the mobile application 106 may access a social media service (application service 116) provided by the service platform. The social media service allows users to capture, share, and comment on images 108 as a part of existing social networks (or in conjunction) with those social networks. For example, a user may publish images 108 captured using a camera on mobile device 105 to a specified social network. In turn, the application 106 retrieves metadata and images 108 and metadata to the multimedia service platform. The multimedia service platform uses the metadata to infer latent interests of the userbase as well as latent relationships between the interests.

The mobile application 106 extracts Exchangeable Image Format (EXIF) metadata from each image 108. The mobile application 106 can also extract other metadata (e.g., PHAsset metadata in Apple iOS devices) describing additional information, such as GPS data. In addition, the mobile application 106 may perform extract, transform, and load (ETL) operations on the metadata to format the metadata for use by components of the multimedia service platform. For example, the mobile application 106 may determine additional information based on the metadata, such as whether a given image was taken during daytime or nighttime, whether the image was taken indoors or outdoors, whether the image is a "selfie," etc. Further, the mobile application 106 also retrieves metadata describing application use. Such metadata includes activity by the user on the mobile application 106, such as image views, tagging, etc. Further, as described below, the mobile application 106 provides functionality that allows a user to search through a collection of images by the additional metadata, e.g., searching a collection of images that are "selfies" and taken in the morning.

In one embodiment, the ETL server 110 includes an ETL application 112. The ETL application 112 receives streams of image metadata 114 (e.g., the EXIF metadata, PHAsset metadata, and additional metadata) from mobile devices 105. Further, the ETL application 112 cleans, stores, and indexes the image metadata 114 for use by the application server 115. Once processed, the ETL application 112 may store the image metadata 114 in a data store, e.g., such as in a database or a Hadoop-based storage architecture (e.g., Hive), for access by the application server 115.

In one embodiment, the application service 116 communicates with the mobile application 106. The application server 115 may be a physical computing system or a virtual machine instance in a computing cloud. Although depicted as a single server, the application server 115 may comprise multiple servers configured as a cluster (e.g., via the Apache Spark framework, a Hadoop-based storage architecture). A clustered architecture allows the application servers 115 to process large amounts of images and image metadata sent from mobile applications 106.

As shown, the application server 115 includes an analysis tool 117, a knowledge graph 118, and a user interest taxonomy 119. As described below, the user interest taxonomy 119 represents interests inferred from image attributes identified from the knowledge graph 118 based on the image metadata 114 from image collections of multiple users.

In one embodiment, the knowledge graph 118 includes a collection of attributes which may be imputed to an image. Example attributes include time and location information, event information, genres, price ranges, weather, subject matter, and the like. The analysis tool 117 builds the knowledge graph 118 using weather data, location data, events data, encyclopedia data, and the like from a variety of data sources.

In one embodiment, the analysis tool 117 imputes attributes from the knowledge graph 118 to an image 108 based on the metadata 114. That is, the analysis tool 117 may correlate time and location information in image metadata 114 to attributes in the knowledge graph 118. For example, assume that a user captures an image 108 of a baseball game. Metadata 114 for that image 108 may include a GPS, a date, and a time when the image 108 was captured. The analysis tool 117 can correlate this information to attributes such as weather conditions at that time and location (e.g., "sunny"), an event name (e.g., "Dodgers Game"), teams playing at that game (e.g., "Dodgers" and "Cardinals"), etc. The analysis tool 117 associates the imputed attributes with the user who took the image. As noted, e.g., a row in a user attribute matrix may be updated to reflect the imputed attributes of each new image taken by that user. Further, the analysis tool 117 may perform machine learning techniques, such as latent Dirichlet analysis (LDA), to decompose the user-attribute matrix into sub-matrices. Doing so allows the analysis tool 117 to identify concepts, i.e., clusters of attributes. The analysis tool 117 may use the user interest taxonomy 119 to generate product recommendations. The analysis tool 117 may also use the interest taxonomy 119 identify one or more users that may be interested in a product or service. For example, the analysis tool 117 may extract information from a product feed 121 of a third party system 120. In one embodiment, the product feed 121 is a listing of products or services of a third party, such as a retailer. The analysis tool 117 may identify, from the product feed 121, one or more attributes describing each product. For example, a product of a shoe retailer may have attributes such as "shoe," "running," "menswear," and so on. The analysis tool 117 can map the attributes of the product feed 121 with the interest taxonomy 119. Doing so allows the analysis tool 117 to identify products and services from the feed 121 that align with interests in the interest taxonomy. In turn, third parties can target users who may be interested in the identified products and services.

Figure 2:
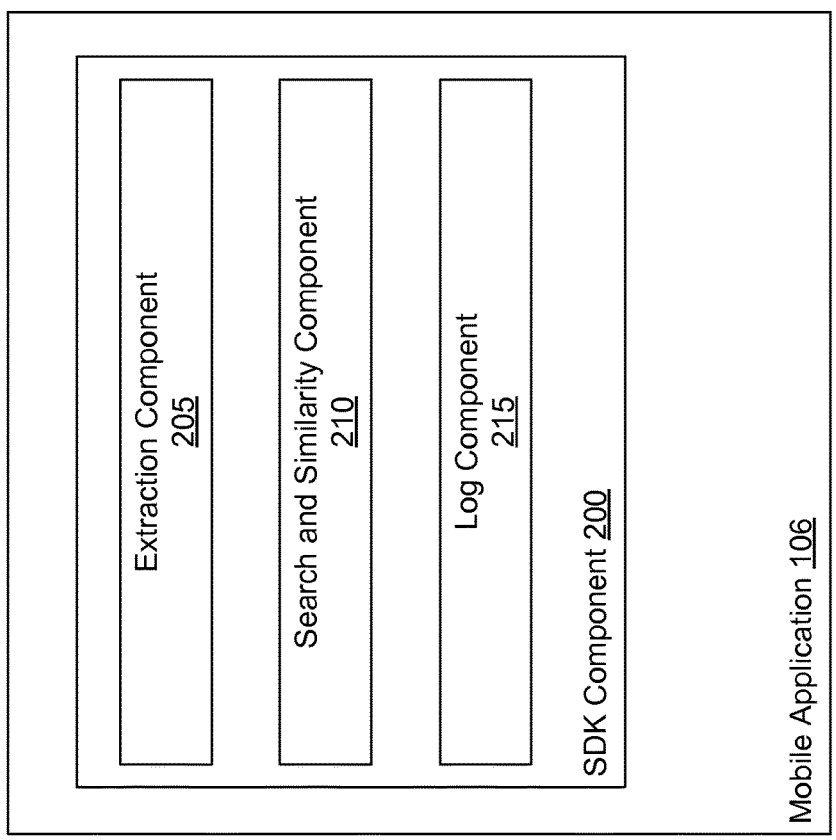
FIG. 2 further illustrates the mobile application described relative to FIG. 1, according to one embodiment.

FIG. 2 illustrates mobile application 106, according to one embodiment. As shown, mobile application 106 includes a SDK component 200 with APIs configured to send image and metadata information to the multimedia service platform. The SDK component 200 further includes an extraction component 205, a search and similarity component 210, and a log component 215. In one embodiment, the extraction component 205 extracts metadata (e.g., EXIF metadata, PHAsset metadata, and the like) from images captured using a mobile device 105. The metadata may describe various aspects specific the image, such as whether the image is in color or black and white, whether the image is a "selfie," and the like. Further, the extraction component 205 may perform ETL preprocessing operations on the metadata. For example, the extraction component 205 may format the metadata for the search and similarity component 210 and the log component 215.

In one embodiment, the search and similarity component 210 infers additional metadata from an image based on the metadata (e.g., spatiotemporal metadata) retrieved by the extraction component 205. Examples of additional metadata include whether a given image was captured at daytime or nighttime, whether the image was captured indoors or outdoors, whether the image was edited, weather conditions when the image was captured, etc. Further, the search and similarity component 210 generates a two-dimensional image feature map from a collection of images captured on a given mobile device 105, where each row represents an image and columns represent metadata attributes. Cells of the map indicate whether an image has a particular attribute. The image feature map allows the search and similarity component 210 to provide search features to a user. For example, the mobile application 106 may search for images on a mobile device which have a given attribute, such as images taken during daytime or taken from a particular location. In turn, the search and similarity component 210 may evaluate the image map to identify images (or other multimedia) having the particular attribute.

In one embodiment, the log component 215 evaluates the image metadata. For example, the log component 215 records metadata sent to the ETL server 110. Once received, the application 112 performs ETL operations, e.g., loading the metadata into a data store (such as a database). The metadata is accessible by the analysis tool 117.

Figure 3:
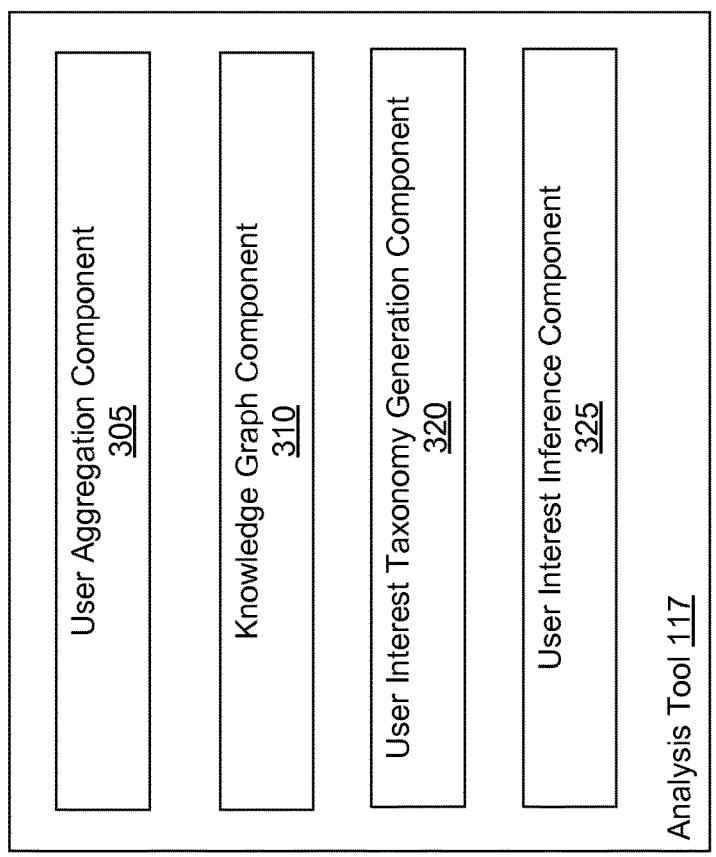
FIG. 3 further illustrates the analysis tool described relative to FIG. 1, according to one embodiment.

FIG. 3 further illustrates the analysis tool 117, according to one embodiment. As shown, the analysis tool 117 includes an aggregation component 305, a knowledge graph component 310, a user interest taxonomy generation component 320, and a user interest inference component 325.

In one embodiment, the aggregation component 305 receives streams of image metadata corresponding to images captured by users of application 106 by users from the ETL server 110. Once received, the aggregation component 305 organizes images and metadata by user. The metadata may include both raw image metadata (e.g., time and GPS information) and inferred metadata (e.g., daytime or nighttime image, indoor or outdoor image, "selfie" image, etc.). To organize metadata by user, the aggregation component 305 evaluates log data from the ETL server 110 to identify image metadata from different devices (and presumably different users) and metadata type (e.g., whether the metadata corresponds to image metadata or application usage data).

In one embodiment, the knowledge graph component 310 builds (and later maintains) the knowledge graph 118 using any suitable data source, such as local news and media websites, online event schedules for performance venues, calendars published by schools, government, or private enterprises, online schedules and ticket sales. The knowledge graph component 310 determines attributes related to each event to store in the knowledge graph 118.

In one embodiment, to impute attributes from the knowledge graph 118 to a given image, the knowledge graph component 310 evaluates time and location metadata of the image against the knowledge graph 118. The knowledge graph component 310 determines whether the image metadata matches a location and/or event in the knowledge graph. The information may be matched using a specified spatiotemporal range, e.g., within a time period of the event, within a set of GPS coordinate range, etc. In one embodiment, the component 310 may further match the information based on a similarity of metadata of other user photos that have been matched to that event.

In one embodiment, the taxonomy component 320 evaluates the user-attribute matrix to determine concepts associated with a given user. As stated, a concept is a cluster of related attributes. The interest taxonomy generation component 320 may perform machine learning techniques, such as Latent Dirichlet Analysis (LDA), Non-Negative Matrix Factorization (NNMF), Deep Learning algorithms, and the like, to decompose the user-attribute matrix into sub-matrices. The taxonomy component 320 evaluates the sub-matrices to identify latent concepts from co-occurring attributes.

Further, the taxonomy component 320 may determine a membership score distribution for each attribute over each concept. A membership score indicates a measure of strength that a given attribute correlates with a concept. The interest taxonomy generation component 320 may populate a concept-attribute matrix, where the rows represent concepts and columns represent attributes. Each cell value is the membership score of the respective attribute to the respective concept. The generation component 320 may perform further machine learning techniques (e.g., LDA, NNMF, Deep Learning, etc.) to identify relationships and hierarchies between each concepts.

In one embodiment, the interest inference component 325 builds a learning model of user interests based on the identified concepts. To do so, the interest inference component 325 may train multi-class classifiers for predicting an interest score. For example, the inference component 325 may use Logistic Regression, Boosting, or Support Vector Machine (SVM) classifiers for each concept to determine user association with one or more concepts. Doing so results in each user in the platform being assigned an interest score per concept. Further, doing so provides positive and negative membership examples used to train the learning model.

Once trained, the interest inference component 325 may predict user interests using the learning model. As the multimedia service platform receives image metadata from new users, the interest inference component 325 can assign the new users with membership scores for each concept based on the metadata and the learning model. A user having a high membership score in a given concept may indicate a high degree of interest for that concept.

Figure 4:
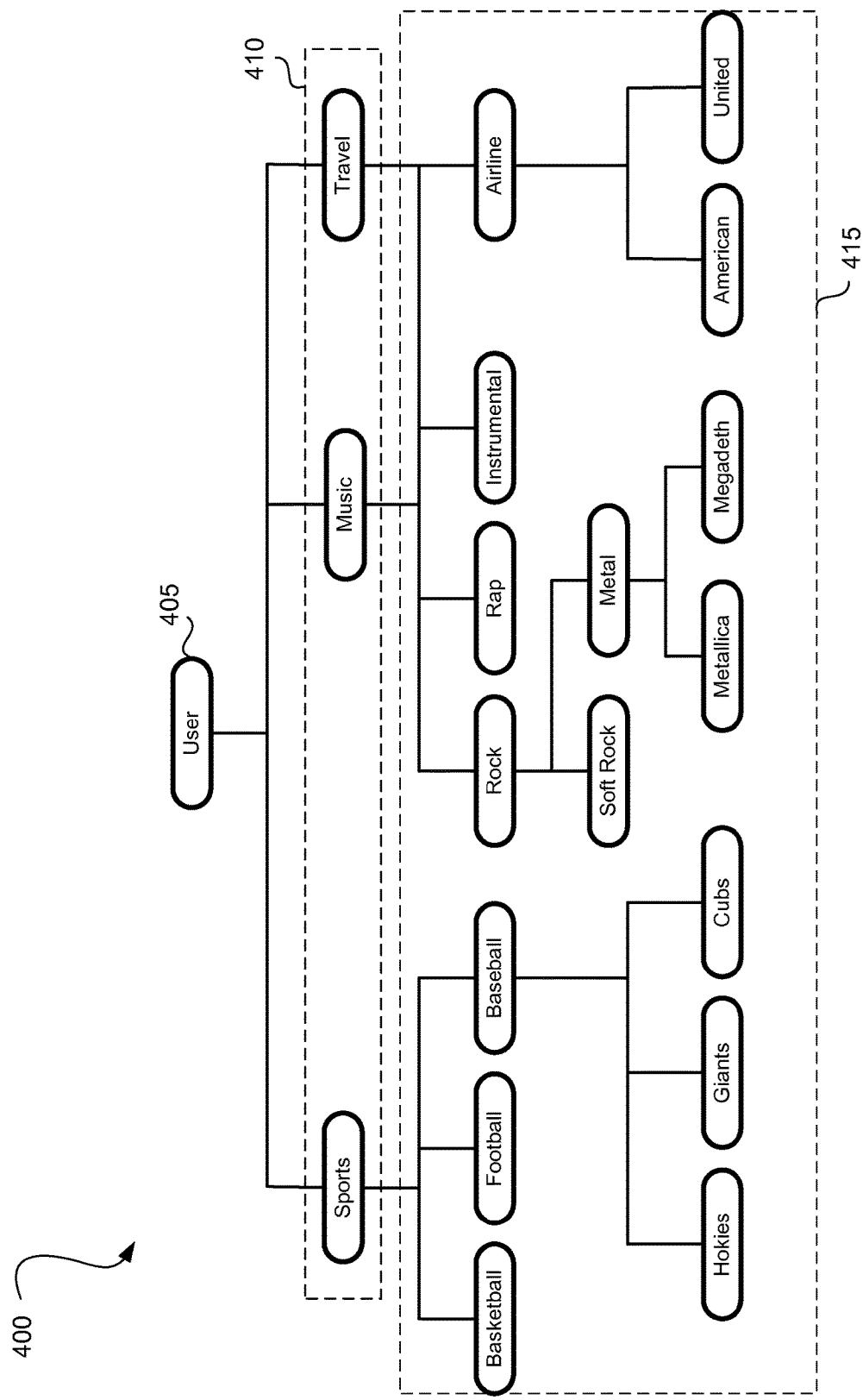
FIG. 4 illustrates an example user interest taxonomy, according to one embodiment.

FIG. 4 illustrates an example user interest taxonomy 400, according to one embodiment. As shown, the taxonomy 400 is a hierarchical representation of user interests identified from image metadata, such as metadata describing time and location information of a given image. Each node in the taxonomy 400 represents a concept identified from one or more attributes. As stated, the interest taxonomy generation component 320 may perform machine learning (e.g., LDA) to identify hierarchies and relationships between concepts. The hierarchies and relationships may further be determined manually (e.g., by a subject matter expert).

The taxonomy 400 includes groups 410 and sub-groups 415. Illustratively, the concepts depicted in groups 410 include generally broader concepts, such as sports, music, and travel. The sub-groups 415 include more specific concepts related to the groups 410, such as basketball, rock, and airlines. Further, each sub-group 415 may have its own subgroup. For example, the baseball node may include sub-group nodes depicting team names. Note, FIG. 4 depicts a relatively small amount of concept nodes in the taxonomy 400. In practice, the taxonomy 400 may include a greater amount of nodes (e.g., 1,000 concept nodes).

Each user in the multimedia service platform may be associated with one or more concepts in the interest taxonomy 400. For a given user, the interest inference component 325 may determine a distribution of membership scores to each identified concept. The membership score may indicate a strength of correlation to a degree of interest that the user has for a given concept. For example, a high membership score in the football concept may indicate that a user has a high interest in football. Further, the interest inference component 325 may build a predictive learning model based on the membership score distribution. The interest inference component 325 can train the model using membership and non-membership of users to a given concept as positive and negative examples of concept membership. Thus, when the multimedia service platform receives new image data and metadata from a user, the interest inference component 325 may predict the user membership scores to each concept based on the image metadata. As a result, the interest inference component 325 can infer additional concepts to which new user belongs, even with a limited amount of image metadata. Such information may be useful to third party advertisers for targeted recommendations.

Figure 5:
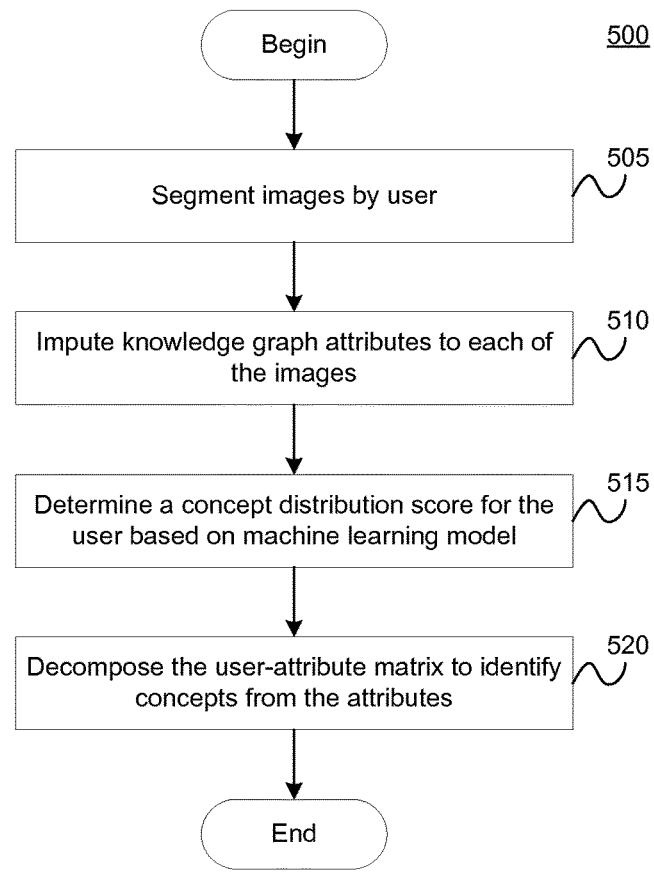
FIG. 5 illustrates a method for generating a user interest taxonomy, according to one embodiment.

FIG. 5 illustrates a method 500 for determining a set of concepts based on image metadata, according to one embodiment. Method 500 begins at step 505, where the aggregation component 305 segments images by users. Doing so allows the analysis tool 107 to evaluate collections of image metadata for each user individually.

At step 510, the knowledge graph component 310 imputes attributes from the knowledge graph 118 onto the images based on the image metadata. To do so, the graph component 310 correlates time and location metadata of a given image to information provided in the knowledge graph, such as events, that coincide with the time and location metadata (with a degree of allowance). As a result, each image is associated with a set of attributes.

At step 515, the knowledge graph component 310 builds a user-attribute matrix based on the imputed attributes to the images. The knowledge graph component 310 further imputes attributes associated with each image to the respective user. Each cell in the user-attribute matrix is an incremental value that represents a count of images in which the corresponding attribute is present.

At step 520, the interest taxonomy generation component 320 decomposes the user-attribute matrix to identify concepts from the attributes. As stated, a concept may include one or more attributes. The interest taxonomy generation component 320 may evaluate the attributes using machine learning techniques to identify the concepts. Further, the interest taxonomy generation component 320 may generate an attribute-concept matrix, where the cell values represent membership scores of each attribute to a given concept. Attributes having a qualifying score may be associated with the concept.

Figure 6:
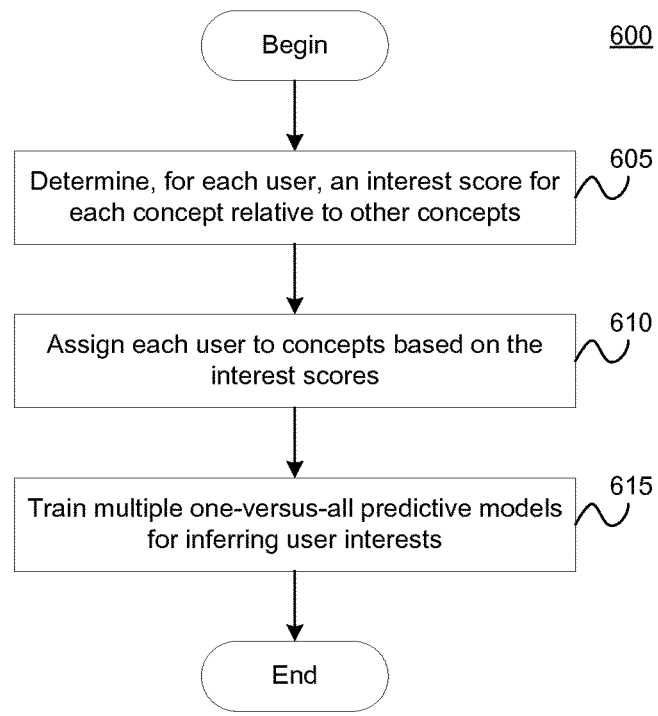
FIG. 6 illustrates a method for building a predictive model for inferring user interests, according to one embodiment.

FIG. 6 illustrates a method 600 for building a predictive model for inferring user interests, according to one embodiment. Method 600 begins at step 605, where the interest inference component 325 determines, for each user, a membership score for each concept relative to other concepts. To do so, the interest inference component 325 may generate a user-attribute-concept matrix which is a dot product of the user-attribute matrix and the attribute concept matrix. Cell values of the user-attribute-concept matrix represent membership scores of a given user to each concept.

At step 610, the interest inference component 325 assigns each user to one or more concepts based on the score. The interest inference component 325 may assign the user to a concept based on the concept in which the user has the highest membership score. Alternatively, the interest inference component 325 may assign the user to a concept based on threshold scores. In particular, if the membership score for a concept exceeds a threshold, the interest inference component 325 assigns the user to the concept.

At step 615, the interest inference component 325 trains multiple one-versus-all predictive models for inferring user interests. The interest inference component 325 may build Support Vector Machine (SVM) classifiers for each concept. The SVM classifiers evaluate a given concept relative to other identified concepts. To train one-versus-all predictive models, the interest inference component 325 may use user membership to concepts as positive and negative examples of membership.

Figure 7:
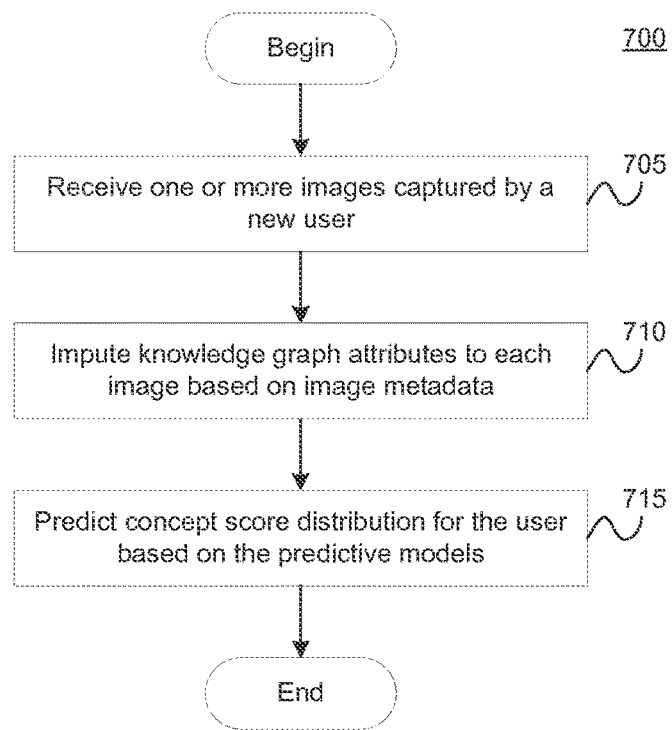
FIG. 7 illustrates a method for inferring user interests based on a predictive model, according to one embodiment.

FIG. 7 illustrates a method 700 for inferring user interests based on a predictive model, according to one embodiment. Method 700 may occur any time a new user sends images to the multimedia service platform through the mobile application 106. As stated, the ETL server 110 formats the image and metadata for processing by the analysis tool 117. Method 700 begins at step 705, where the user aggregation component 305 receives one or more images captured by the new user. The user aggregation component 305 segments the images by user ID.

At step 710, the knowledge graph component 310 imputes attributes from the knowledge graph 118 to each image based on image metadata. To do so, the knowledge graph component 310 correlates time and location metadata of a given image to information provided in the knowledge graph, such as events, that coincide with the time and location metadata (with a degree of allowance). As a result, each image is associated with a set of attributes.

At step 715, the interest inference component 325 predicts a concept score distribution for the user based on the predictive models. The interest inference component 710 may evaluate the attributes identified in the knowledge graph imputation to determine concept scores for each attribute based on the predictive models. The interest inference component 325 may perform a dot product of the user row in the user-attribute matrix to the concept-attribute matrix to determine user membership scores to each concept. The interest inference component may then assign the new user to one or more concepts based on the scores.

Figure 8:
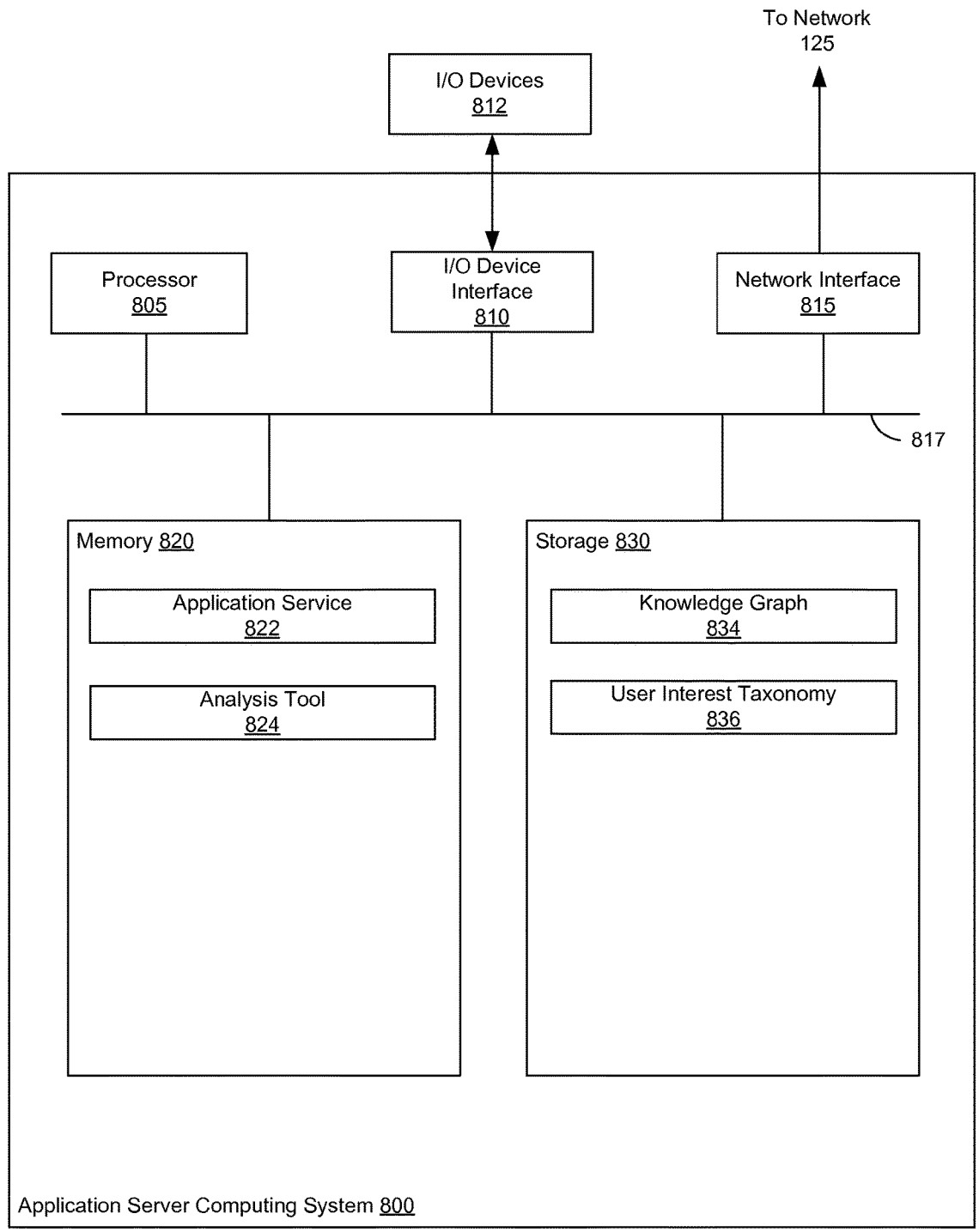
FIG. 8 illustrates an application server computing system, according to one embodiment.

FIG. 8 illustrates an application server computing system 800 configured to impute knowledge graph attributes onto image metadata, according to one embodiment. As shown, the computing system 800 includes, without limitation, a central processing unit (CPU) 805, a network interface 815, a memory 820, and storage 830, each connected to a bus 817. The computing system 800 may also include an I/O device interface 810 connecting I/O devices 812 (e.g., keyboard, mouse, and display devices) to the computing system 800. Further, in context of this disclosure, the computing elements shown in computing system 800 may correspond to a physical computing system (e.g., a system in a data center) or may be a virtual computing instance executing within a computing cloud.

The CPU 805 retrieves and executes programming instructions stored in the memory 820 as well as stores and retrieves application data residing in the memory 820. The interconnect 817 is used to transmit programming instructions and application data between the CPU 805, I/O devices interface 810, storage 78 representative of a single CPU, multiple CPUs, a single CPU having multiple processing cores, and the like. And the memory 820 is generally included to be representative of a random access memory. The storage 830 may be a disk drive storage device. Although shown as a single unit, the storage 830 may be a combination of fixed and/or removable storage devices, such as fixed disc drives, removable memory cards, or optical storage, network attached storage (NAS), or a storage area-network (SAN).

Illustratively, the memory 820 includes an application service 822 and an analysis tool 824. The storage 830 includes a knowledge graph 834, and an interest taxonomy 836. The application service 822 provides access to various services of the multimedia service platform to mobile devices. The analysis tool 824 generates a user interest taxonomy 836 based on metadata of images taken by users.

In one embodiment, the analysis tool 824 builds the knowledge graph 834 from external data sources. To do so, the analysis tool 824 performs NLP techniques on the raw text obtained from the data sources to identify relevant terms related to events, moments, weather, etc.

In one embodiment, the analysis tool 824 may impute information from the knowledge graph 834 images submitted to the multimedia service platform. In addition, the analysis tool 824 generates a user interest taxonomy 836 of concepts inferred from the attributes. To do so, the analysis tool 824 may perform machine learning techniques (e.g., LDA, pLSA, NNMF, etc.) to learn concepts based on co-occurring attributes. In addition, the analysis tool 824 may determine a membership score for each attribute to each identified concept. The analysis tool 824 may associate attributes to a given concept based on the membership score. Further, the analysis tool 824 may identify hierarchical relationships between the concepts through machine learning.

In one embodiment, the analysis tool 824 performs further machine learning techniques to assign users to each identified concept. In particular, the analysis tool 824 may determine membership scores for each concept for a given user. The user may be associated with a concept in which the membership score is the highest. Alternatively, the user may be associated with multiple concepts based on the top membership scores (e.g., top five scores, top ten scores, etc.). The analysis tool 824 may train SVM classifiers for each concept to build a predictive model that can be used to predict membership scores for new users.

While the foregoing is directed to embodiments of the present disclosure, other and further embodiments of the disclosure may be devised without departing from the basic scope thereof, and the scope thereof is determined by the claims that follow.

What is claimed is:

1. A method for inferring user interests based on metadata of a plurality of multimedia objects captured by a plurality of users, the method comprising:
   receiving, for each of the users, metadata describing each multimedia object in the plurality of objects associated with that user, wherein each multimedia object includes one or more attributes imputed to that object based on the metadata and wherein each multimedia object is one of an image or a video;
   identifying one or more concepts from the one or more attributes, wherein each concept includes at least a first attribute that co-occurs with a second attribute imputed to a first multimedia object; and
   associating a first one of the plurality of users with at least one of the concepts based on the attributes imputed to multimedia objects associated with the first one of the plurality of users.

2. The method of claim 1, further comprising:
   training a learning model based on the association of the first one of the plurality of users with the at least one of the one or more concepts, wherein the learning model predicts associations of the first one of the plurality of users to one or more concepts not currently associated with the first one of the plurality of users.

3. The method of claim 2, wherein the prediction is based on a correlation between at least a first concept in the associated one or more concepts and each of the one or more concepts.

4. The method of claim 2, further comprising:
   receiving metadata of a plurality of multimedia objects associated with a second one of the plurality of users, wherein each of the multimedia objects associated with the second one of the plurality of users includes one or more attributes imputed to that object based on the metadata; and
   associating at least one of the one or more concepts with the second one of the plurality of users based on the learning model.

5. The method of claim 1, wherein associating the first one of the plurality of users with at least one of the one or more concepts comprises:
   determining a correlation measure between the first one of the plurality of users to each of the concepts based on the attributes imputed to multimedia objects in the plurality of multimedia objects associated with the first one of the plurality of users.

6. The method of claim 4, wherein the first one of the plurality of users is associated with the at least one of the one or more concepts based on the correlation measure associated with that concept.

7. The method of claim 1, wherein the concepts are identified based on Latent Dirichlet Allocation (LDA).

8. The method of claim 1, further comprising:
   determining, from the one or more concepts, a hierarchical relationship between a first concept and at least a second concept.

9. A non-transitory computer-readable storage medium storing instructions, which, when executed on a processor, performs an operation for inferring user interests based on metadata of a plurality of multimedia objects captured by a plurality of users, the operation comprising:
   receiving, for each of the users, metadata describing each multimedia object in the plurality of objects associated with that user, wherein each multimedia object includes one or more attributes imputed to that object based on the metadata and wherein each multimedia object is one of an image or a video;
   identifying one or more concepts from the one or more attributes, wherein each concept includes at least a first attribute that co-occurs with a second attribute imputed to a first multimedia object; and
   associating a first one of the plurality of users with at least one of the concepts based on the attributes imputed to multimedia objects associated with the first one of the plurality of users.

10. The computer-readable storage medium of claim 9, wherein the operation further comprises:
    training a learning model based on the association of the first one of the plurality of users with the at least one of the one or more concepts, wherein the learning model predicts associations of the first one of the plurality of users to one or more concepts not currently associated with the first one of the plurality of users.

11. The computer-readable storage medium of claim 10, wherein the prediction is based on a correlation between at least a first concept in the associated one or more concepts and each of the one or more concepts.

12. The computer-readable storage medium of claim 10, wherein the operation further comprises:
    receiving metadata of a plurality of multimedia objects associated with a second one of the plurality of users, wherein each of the multimedia objects associated with the second one of the plurality of users includes one or more attributes imputed to that object based on the metadata; and
    associating at least one of the one or more concepts with the second one of the plurality of users based on the learning model.

13. The computer-readable storage medium of claim 9, wherein associating the first one of the plurality of users with at least one of the one or more concepts comprises:
    determining a correlation measure between the first one of the plurality of users to each of the concepts based on the attributes imputed to multimedia objects in the plurality of multimedia objects associated with the first one of the plurality of users.

14. The computer-readable storage medium of claim 13, wherein the first one of the plurality of users is associated with the at least one of the one or more concepts based on the correlation measure associated with that concept.

15. The computer-readable storage medium of claim 9, wherein the concepts are identified based on Latent Dirichlet Allocation (LDA).

16. A system, comprising:
a processor; and
a memory storing one or more application programs configured to perform an operation for inferring user interests based on metadata of a plurality of multimedia objects captured by a plurality of users, the operation comprising:
receiving, for each of the users, metadata describing each multimedia object in the plurality of objects associated with that user, wherein each multimedia object includes one or more attributes imputed to that object based on the metadata;
identifying one or more concepts from the one or more attributes, wherein each concept includes at least a first attribute that co-occurs with a second attribute imputed to a first multimedia object; and
associating a first one of the plurality of users with at least one of the concepts based on the attributes imputed to multimedia objects associated with the first one of the plurality of users by determining a correlation measure between the first one of the plurality of users to each of the concepts based on the attributes imputed to multimedia objects in the plurality of multimedia objects associated with the first one of the plurality of users.

17. The system of claim 16, wherein the operation further comprises:
training a learning model based on the association of the first one of the plurality of users with the at least one of the one or more concepts, wherein the learning model predicts associations of the first one of the plurality of users to one or more concepts not currently associated with the first one of the plurality of users.

18. The system of claim 17, wherein the prediction is based on a correlation between at least a first concept in the associated one or more concepts and each of the one or more concepts.

19. The system of claim 17, wherein the operation further comprises:
receiving metadata of a plurality of multimedia objects associated with a second one of the plurality of users, wherein each of the multimedia objects associated with the second one of the plurality of users includes one or more attributes imputed to that object based on the metadata; and
associating at least one of the one or more concepts with the second one of the plurality of users based on the learning model.

20. The system of claim 16, wherein the first one of the plurality of users is associated with the at least one of the one or more concepts based on the correlation measure associated with that concept.

21. The system of claim 16, wherein the concepts are identified based on Latent Dirichlet Allocation (LDA).

22. The system of claim 16, wherein each multimedia object is one of an image or a video.

23. The system of claim 16, wherein the operation further comprises:
determining, from the one or more concepts, a hierarchical relationship between a first concept and at least a second concept.

\* \* \* \* \*